US011343585B2

(12) United States Patent
Cheng et al.

(10) Patent No.: US 11,343,585 B2
(45) Date of Patent: May 24, 2022

(54) METHOD AND APPARATUS FOR TRANSMITTING VIDEO STREAMS IN WIFI MESH NETWORKS

(71) Applicant: Nokia Solutions and Networks Oy, Espoo (FI)

(72) Inventors: Gang Cheng, Shanghai (CN); Dingjun He, Shanghai (CN); Junkui Li, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/886,267

(22) Filed: May 28, 2020

(65) Prior Publication Data

US 2020/0404389 A1    Dec. 24, 2020

(30) Foreign Application Priority Data

Jun. 21, 2019   (CN) .......................... 201910542586.7

(51) Int. Cl.
| | | |
|---|---|---|
| *H04N 21/64* | (2011.01) | |
| *H04N 21/6405* | (2011.01) | |
| *H04L 65/60* | (2022.01) | |
| *H04N 21/6408* | (2011.01) | |
| *H04N 21/24* | (2011.01) | |
| *H04L 69/324* | (2022.01) | |
| *H04N 21/845* | (2011.01) | |
| *H04L 69/329* | (2022.01) | |

(Continued)

(52) U.S. Cl.
CPC ......... *H04N 21/6405* (2013.01); *H04L 65/60* (2013.01); *H04L 69/324* (2013.01); *H04L 69/329* (2013.01); *H04N 21/2402* (2013.01); *H04N 21/6408* (2013.01); *H04N 21/8455* (2013.01); *H04W 84/12* (2013.01); *H04W 84/18* (2013.01)

(58) Field of Classification Search
CPC ....................................................... H04N 21/64
See application file for complete search history.

(56) References Cited

U.S. PATENT DOCUMENTS

| | | | | |
|---|---|---|---|---|
| 2011/0225311 A1* | 9/2011 | Liu | ........................ | H04L 45/125 709/231 |
| 2011/0225312 A1* | 9/2011 | Liu | ........................ | H04N 21/00 709/231 |
| 2012/0243457 A1 | 9/2012 | Narasimhan et al. | | |

FOREIGN PATENT DOCUMENTS

| | | |
|---|---|---|
| CN | 1937519 A | 3/2007 |
| CN | 101102283 A | 1/2008 |

(Continued)

*Primary Examiner* — Sulaiman Nooristany
(74) *Attorney, Agent, or Firm* — Fay Sharpe LLP

(57) ABSTRACT

The present disclosure provides a technical scheme for transmitting video streams in WiFi mesh networks, including a method for transmitting multicast video in an access points in a WiFi mesh network, wherein the method includes: receiving a video stream and determining the node(s) to which the video stream needs to be transmitted, wherein the video stream includes a multicast address; determining dynamically a transmission mode of the video stream and transmitting corresponding video stream to multiple stations using the transmission mode when the nodes are the multiple stations corresponding to the multicast address; transmitting corresponding video stream to a next access point using unicast mode when the node is the next access point.

8 Claims, 7 Drawing Sheets

(51) Int. Cl.
 *H04W 84/18* (2009.01)
 *H04W 84/12* (2009.01)

(56) References Cited

FOREIGN PATENT DOCUMENTS

| | | |
|---|---|---|
| CN | 103974363 A | 8/2014 |
| CN | 107959672 A | 4/2018 |

* cited by examiner

US 11,343,585 B2

METHOD AND APPARATUS FOR TRANSMITTING VIDEO STREAMS IN WIFI MESH NETWORKS

TECHNICAL FIELD

The present disclosure relates to the field of wireless communication technologies, and in particular relates to a technical scheme for transmitting video stream(s) in WiFi (Wireless Fidelity) mesh networks.

BACKGROUND

WiFi mesh networks (WMNs) are widely considered a promising and practical wireless solution for broadband internet access, it combines the advantages of WLAN (wireless local area networks) and mobile Ad-Hoc networks, and has the characteristics of flexible networking, multi-hop, and high throughput, etc. At present, indoor WiFi mesh network has gradually become a popular WiFi deployment scheme in the home, and this scheme would require 2 or 3 or more WiFi access points (AP) to interconnect in order to extend wireless coverage in the home. As WiFi mesh networks become more and more popular, more and more people expect to obtain better video experience quality based on WiFi mesh networks.

BRIEF SUMMARY

An object of the present disclosure is to provide a technical scheme for transmitting video stream(s) in WiFi mesh networks.

According to one aspect of the present disclosure, there is provided a method for transmitting multicast video in an access point in a WiFi mesh network, wherein, said method includes:

receiving a video stream and determining the node(s) to which the video stream needs to be transmitted, wherein the video stream includes a multicast address;

determining dynamically a transmission mode of the video stream and transmitting corresponding video stream to multiple stations using the transmission mode when the nodes are the multiple stations corresponding to the multicast address;

transmitting corresponding video stream to a next access point using unicast mode when the node is the next access point.

According to another aspect of the present disclosure, there is also provided a method for transmitting multiple video streams in an access point in a WiFi mesh network, wherein, the method includes:

creating, for the multiple video streams that are received, multiple video queues at the application layer, wherein each video queue contains one of the multiple video streams;

determining, for each video queue, the weight of the video queue according to link related information corresponding to the video stream contained in the video queue;

transmitting the multiple video streams from the application layer to the MAC (Media Access Control) layer according to the weight corresponding to each video queue, in order to transmit the multiple video streams to the corresponding node.

According to another aspect of the present disclosure, there is also provided a first apparatus for transmitting multicast videos in an access point in a WiFi mesh network, wherein, the first apparatus includes:

means for receiving a video stream and determining the node(s) to which the video stream needs to be transmitted, wherein the video stream includes a multicast address;

means for determining dynamically a transmission mode of the video stream and transmitting corresponding video stream to multiple stations using the transmission mode when the nodes are the multiple stations corresponding to the multicast address;

means for transmitting corresponding video stream to a next access point using unicast mode when the node is the next access point.

According to another aspect of the present disclosure, there is also provided a second apparatus for transmitting video streams in an access point in a WiFi mesh network, wherein, the second apparatus includes:

means for creating, for the multiple video streams that are received, multiple video queues at the application layer, wherein each video queue contains one of the multiple video streams;

means for determining, for each video queue, the weight of the video queue according to link related information corresponding to the video stream contained in the video queue;

means for transmitting the multiple video streams from the application layer to the MAC layer according to the weight corresponding to each video queue, in order to transmit the multiple video streams to the corresponding node.

According to another aspect of the present disclosure, there is also provided an access point in a WiFi mesh network, wherein, the access point includes the first apparatus described in the present disclosure.

According to another aspect of the present disclosure, there is also provided an access point in a WiFi mesh network, wherein, the access point includes the second apparatus described in the present disclosure.

According to another aspect of the present disclosure, there is also provided an access point, wherein, the access point includes:

a memory for storing one or more programs;

one or more processors connected with the memory, when executed by the one or more processors, the one or more programs cause the one or more processors to perform the following operations:

receiving a video stream and determining the node(s) to which the video stream needs to be transmitted, wherein the video stream includes a multicast address;

determining dynamically a transmission mode of the video stream and transmitting corresponding video stream to multiple stations using the transmission mode when the nodes are the multiple stations corresponding to the multicast address;

transmitting corresponding video stream to a next access point using unicast mode when the node is the next access point.

According to another aspect of the present disclosure, there is also provided an access point, wherein, the access point includes:

a memory for storing one or more programs;

one or more processors connected with the memory, when executed by the one or more processors, the one or more programs cause the one or more processors to perform the following operations:

creating, for the multiple video streams that are received, multiple video queues at the application layer, wherein each video queue contains one of the multiple video streams;

determining, for each video queue, the weight of the video queue according to link related information corresponding to the video stream contained in the video queue;

transmitting the multiple video streams from the application layer to the MAC layer according to the weight corresponding to each video queue, in order to transmit the multiple video streams to the corresponding node.

According to another aspect of the present disclosure, there is also provided a computer readable storage medium storing a computer program, which when executed by a processor, cause the processor to perform the following operations:

receiving a video stream and determining the node(s) to which the video stream needs to be transmitted, wherein the video stream includes a multicast address;

determining dynamically a transmission mode of the video stream and transmitting corresponding video stream to multiple stations using the transmission mode when the nodes are the multiple stations corresponding to the multicast address;

transmitting corresponding video stream to a next access point using unicast mode when the node is the next access point.

According to another aspect of the present disclosure, there is also provided a computer readable storage medium storing a computer program, which when executed by a processor, cause the processor to perform the following operations:

creating, for the multiple video streams that are received, multiple video queues at the application layer, wherein each video queue contains one of the multiple video streams;

determining, for each video queue, the weight of the video queue according to link related information corresponding to the video stream contained in the video queue;

transmitting the multiple video streams from the application layer to the MAC layer according to the weight corresponding to each video queue, in order to transmit the multiple video streams to the corresponding node.

Compared with the prior art, the present disclosure has the following advantages: a new transmission mechanism for transmitting multicast video in WiFi mesh network is established, the multicast video can be converted to a unicast video stream in backhaul link, the transmission mode may be determined in real time in an access point according to the actual link conditions in fronthaul link, i.e., adaptively selecting whether the fronthaul link adopts multicast mode or unicast mode, thereby ensuring the experience quality of multicast video, and achieving reliable transmission of multicast videos in WiFi mesh network; By creating multiple video queues corresponding to multiple video streams at the application layer and adaptively adjusting the weight of each video queue according to the actual link conditions, those multiple video streams can be transmitted from the application layer to the VI queue at the MAC layer based on the weight of each video queue and thereby enabling distinguishing multiple video streams from each other in WiFi mesh network, and therefore better video quality can be achieved. Furthermore, a multi-layer structure of adaptive multiple queues management is established in each access point to support video stream transmission with good QoS for heterogeneous stations. In addition, by creating a first additional queue and a second additional queue at the application layer, retransmission of I-frames and other failure packets can be achieved, in particular, treating I-frames as the frames with the highest priority among all the video frames transmitted to STAs is supported, so that an I-frame can be retransmitted immediately when failure occurs and thereby ensuring user experience quality.

BRIEF DESCRIPTION OF THE DRAWINGS

Other features, objectives, and advantages of the present disclosure will become more apparent through reading the following detailed depiction of the non-limitative embodiments with reference to the accompanying drawings.

The same or similar reference numerals in the drawings denote the same or similar components.

DETAILED DESCRIPTION

Figure 1:
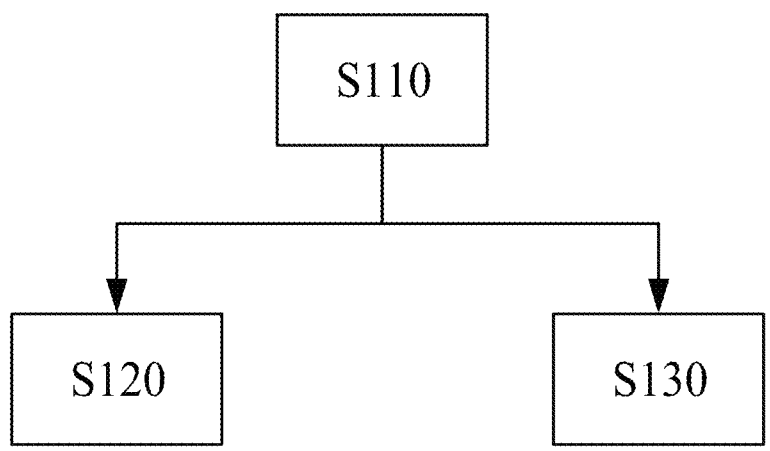
FIG. 1 shows a flowchart of a method for transmitting multicast video in an access point in a WiFi mesh network according to an embodiment of the present disclosure.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be rearranged. The processes may be terminated when its operations are completed, but may also have additional steps not included in the figure. The processes may correspond to methods, functions, procedures, subroutines, subprograms, etc.

The schemes of the respective embodiments of the present disclosure apply in WiFi mesh networks, a WiFi mesh network includes therein multiple access points and multiple stations (STAs), the access points are network side devices that are able to provide wireless signals reception and transmission services for the stations, the wireless signals provided by each access point may cover a certain location range, the stations within the coverage range access to the network through that access point, and the stations are terminals (such as laptops, PDAs and other user equipments with networking capabilities) that are able to connect to the network through access point; wherein, the transmission channel between the access points is called backhaul, and the transmission channel between an access point and a station is called fronthaul.

The methods (some of which are showed by flowcharts) discussed infra may be implemented through hardware, software, firmware, middleware, microcode, hardware description language or any combination thereof. When they are implemented with software, firmware, middleware or microcode, the program code or code segment for executing essential tasks may be stored in a machine or a computer readable medium (e.g., storage medium). (One or more) processors may implement essential tasks.

The specific structures and function details disclosed here are only representative, for a purpose of describing the exemplary embodiments of the present disclosure. The present disclosure, however, may be specifically implemented through many alternative embodiments, and should not be construed as limited to only the embodiments illustrated here.

It will be understood that although terms "first," "second" might be used here to describe respective units, these units should not be limited by these terms. Use of these terms is only for distinguishing one unit from another. For example, without departing from the scope of the exemplary embodiments, the first unit may be referred to as the second unit, and similarly the second unit may be referred to as the first unit. The term "and/or" used here includes any and all combinations of one or more associated items as listed.

The terms used here are only for describing preferred embodiments, not intended to limit exemplary embodiments. Unless otherwise indicated, singular forms "a" or "one" used here further intends to include plural forms. It should also be appreciated that the terms "comprise" and/or "include" used here prescribe existence of features, integers, steps, operations, units and/or components as stated, but do not exclude existence or addition of one or more other features, integers, steps, operations, units, components, and/or a combination thereof.

It should also be noted that in some alternative embodiments, the functions/actions as mentioned may occur in an order different from what is indicated in the drawings. For example, dependent on the functions/actions involved, two successively illustrated diagrams may be executed substantially simultaneously or in a reverse order sometimes.

Hereinafter, further detailed description will be made to the present disclosure with reference to the accompanying drawings.

FIG. 1 shows a flowchart of a method for transmitting multicast video in an access point in a WiFi mesh network according to an embodiment of the present disclosure. In this embodiment, the root access point (root AP) in the WiFi mesh network supports IGMP (Internet Group Management Protocol) Proxy for IGMP Layer 3 convergence, and the subsequent access points (i.e. the non-root APs) support IGMP Snooping, therefore a mapping table between stations and multicast address is established in the root access point and its subsequent access points in the WiFi mesh network. The method of this embodiment may be implemented in any access point (such as the root access point or any of the subsequent access points) in the WiFi mesh network. The method according to the present embodiment includes step S110, step S120 and step S130.

In step S110, the access point receives a video stream, and determines the node(s) to which the video stream needs to be transmitted, wherein the video stream includes a multicast address.

Wherein, the video stream may be a multicast video stream from a sending source (or referred to as "video source", such as a cloud server and the like), or may be a unicast video stream converted based on the multicast video stream. The access point can determine that the video stream is based on the multicast video from the sending source according to the multicast address in the video stream, that is, this transmission process is a transmission process for the multicast video.

Wherein, the node(s) to which the video stream needs to be transmitted may be multiple stations corresponding to the multicast address (i.e., the video stream needs to be transmitted to STAs), or may be a next level access point of this access point.

In some embodiments, a root access point receives a multicast video stream from the uplink, and checks whether the node(s) to which the multicast video stream needs to be transmitted is/are a next access point or STAs. In some other embodiments, a subsequent access point of a root access point receives a unicast video stream from its upper access point, this unicast video stream is obtained by multicast-to-unicast conversion based on a multicast video stream from the sending source, this unicast video stream includes therein a destination unicast address pointing to this subsequent access point and the multicast address, this subsequent access point checks whether the node(s) to which that unicast video stream needs to be transmitted is/are a next access point or STAs.

In step S120, the access point determines dynamically a transmission mode of the video stream, and transmits corresponding video stream to multiple stations using the transmission mode when the nodes are the multiple stations corresponding to the multicast address.

Specifically, when the video stream needs to be transmitted to STAs, the access point determines dynamically whether the transmission mode of the video stream is multicast mode or unicast mode, and obtains multiple video streams that need to be transmitted respectively to the multiple STAs based on the determined transmission mode and the video stream, and transmits those multiple video streams respectively to the corresponding STAs with the determined transmission mode.

Wherein, the access point may adaptively select whether to adopt multicast mode or unicast mode based on the actual link conditions between the access point and each station in the multiple stations.

In some embodiments, the operation of the access point determining dynamically a transmission mode of the video stream includes: calculating a total throughput according to the currently supported traffic between the access point and each of the multiple stations; determining the transmission mode of the video stream according to the total throughput.

Optionally, the access point calculates the total throughput according to the currently supported traffic between the access point and each station based on the following formula:

$$TotalThroughput = \sum_{y=1}^{n} VideoStream(y)$$

wherein, TotalThroughput represents the total throughput, y represents the number of video stream with y=(1, 2 ... n), n represents the number of multicast members (i.e. the number of the multiple stations), and VideoStream(y) represents the currently supported traffic between the access point and the station to which the video stream numbered y is to be transmitted. It should be noted that the above formula for calculating the total throughput is only an example, and not intended to limit the present disclosure. Those skilled in the art should understand that any implementation for calculating the total throughput according to the currently supported traffic between the access point and each of the multiple stations (such as a simple transformation of the above formula for calculating the total throughput), should be included in the protection scope of the present disclosure.

Optionally, the operation of determining the transmission mode of the video stream according to the total throughput includes: determining that the transmission mode of the video stream is multicast mode when the total throughput is greater than or equal to a throughput threshold; determining that the transmission mode of the video stream is unicast mode when the total throughput is less than the throughput threshold. Wherein, each access point maintains therein a throughput threshold supported by that access point, and optionally, the throughput threshold can adjust dynamically.

In some embodiments, the access point is the root access point, the video stream is a multicast video stream from the uplink, the operation of transmitting corresponding video stream to multiple stations using the transmission mode includes: transmitting the multicast video stream directly to the multiple stations using multicast mode if the transmission mode is multicast mode; converting, for each station in the multiple stations, the multicast video stream to a unicast video stream that includes a destination unicast address pointing to that station and transmitting that unicast video stream to that station using unicast mode if the transmission mode is unicast mode. Wherein, if the access point determines dynamically that the transmission mode of the multicast video stream is multicast mode, the access point transmits the video stream respectively to the corresponding stations directly. Wherein, if the access point determines dynamically that the transmission mode of the multicast video stream is unicast mode, for each station in the multiple stations, the access point adds a destination unicast address pointing to that station in the video stream obtained by replication based on the multicast video stream, i.e. converts the multicast video stream to a unicast video stream that includes a destination unicast address pointing to that station, and transmits that unicast video stream to that station using unicast mode; if unicast mode is used between the access point and a station, the multicast address may be deleted while adding a destination unicast address pointing to that station.

In some embodiments, the access point is a non-root access point, the video stream is a unicast video stream from the upper node of the access point, that unicast video stream includes therein a destination unicast address pointing to the access point and the multicast address, the operation of transmitting corresponding video stream to the multiple stations using the transmission mode includes: deleting the destination unicast address in that unicast video stream to obtain a multicast video stream and transmitting the obtained multicast video stream to the multiple stations using multicast mode if the transmission mode is multicast mode; modifying, for each station in the multiple stations, the destination unicast address pointing to that access point in that unicast video stream to a destination unicast address pointing to that station and transmitting the modified unicast video stream to that station using unicast mode if the transmission mode is unicast mode.

In step S130, the access point transmits corresponding video stream to a next access point using unicast mode when the node is the next access point.

In some embodiments, the access point is the root access point, the video stream is a multicast video stream from the uplink, the step S130 further includes: converting the multicast video stream to a unicast video stream and transmitting the unicast video stream to the next access point using unicast mode when the node is a next access point, wherein, the unicast video stream includes therein the multicast address and a destination unicast address pointing to the next access point.

In some embodiments, the access point is a non-root access point, the video stream is a unicast video stream from the upper access point, this unicast video stream includes therein the multicast address and a destination unicast address pointing to the access point, the step S130 further includes: modifying, when the node is a next access point, the destination unicast address pointing to the access point in the unicast video stream to a destination unicast address pointing to the next access point, and transmitting this unicast video stream to the next access point using unicast mode.

In some embodiments, the transmission operations performed in the step S120 and step S130 include: adjusting the priority of the access category queue for transmitting video stream to highest at the MAC layer, in order to transmit corresponding video stream to the multiple stations or to the next access point. Wherein, the access category queue for transmitting video stream is the AC_VI queue defined in 802.11e.

In some embodiments, a ZeroVideoFrameLost mechanism may be introduced in backhaul link and in fronthaul link, that is, if an access point does not receive an acknowledgement (ACK) message from other node after sending video packets to the other node, that access point will store the failure packets in the corresponding queue at the application layer and retransmit in the specified time slot for video playing, so that retransmission of multicast video packets can be achieved in WiFi mesh network. The specific implementations of the ZeroVideoFrameLost mechanism described in the subsequent embodiments can also be applied to the multicast video stream in this embodiment, which will not be described in detail here.

According to the scheme of this embodiment, a new transmission mechanism for transmitting multicast video in WiFi mesh network is established, the multicast video can be converted to a unicast video stream in backhaul link, the transmission mode may be determined in real time in an access point according to the actual link conditions in fronthaul link, i.e., adaptively selecting whether the fronthaul link adopts multicast mode or unicast mode, thereby ensuring the experience quality of multicast video, and achieving reliable transmission of multicast videos in WiFi mesh network.

Figure 2:
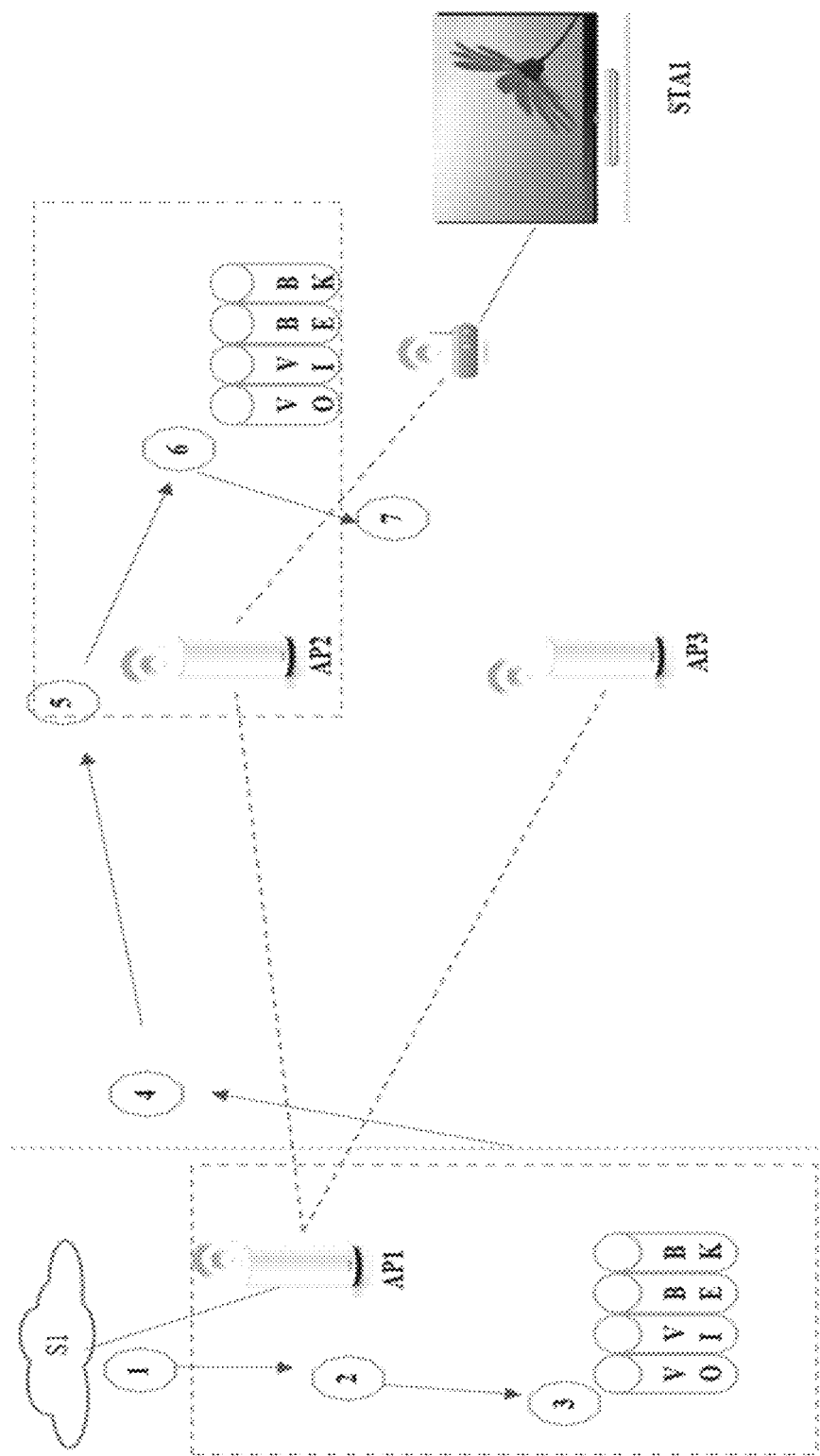
FIG. 2 shows a schematic architectural diagram for transmitting multicast video in a WiFi mesh network according to an example of the present disclosure.

FIG. 2 shows a schematic architectural diagram for transmitting multicast video in a WiFi mesh network according to an example of the present disclosure. It should be noted that, for simplicity, FIG. 2 only shows the root access point AP1, the subsequent access points AP2 and AP3, and STA1 in a WiFi mesh network, those skilled in the art should understand that a WiFi mesh network should include multiple access points, and each access point is associated with multiple stations. FIG. 2 exemplarily shows the following process of transmitting multicast video in a WiFi mesh network: 1) the root access point AP1 receives a multicast video from the sending source S1, and determines that the multicast video needs to be transmitted to a next node AP2; 2) AP1 performs multicast-to-unicast converting operation on the multicast video, wherein a destination unicast address pointing to AP2 is added before the multicast address of the multicast video, thereby obtaining a unicast video stream pointing to AP2; 3) the unicast video stream pointing to AP2 is transmitted to the VI queue of the MAC layer in unicast mode, and the VI queue is adjusted to high priority; 4) the unicast video stream pointing to AP2 is transmitted to AP2, and a ZeroVideoFrameLost mechanism is introduced in this transmission process; 5) AP2 receives the unicast video stream pointing to AP2 and determines that the next nodes to be transmitted to are STAs, AP2 determines in real time that the transmission mode for the video stream is unicast mode, that is, the corresponding video stream needs to be transmitted respectively in unicast mode to the each station corresponding to the multicast address, take STA1, one of the stations corresponding to the multicast address, as an example, AP2 modifies the destination unicast address pointing to AP2 in the received unicast video stream to a destination unicast address pointing to STA1; 6) the modified unicast video stream is transmitted to the VI queue of the MAC layer, and the VI queue is adjusted to high priority; 7) the modified unicast video stream is transmitted to STA1 in unicast mode, and a ZeroVideoFrameLost mechanism is introduced in this transmission process. It should be noted that, the multicast address corresponds to multiple STAs, the transmission process in which AP2 transmits the corresponding video stream in unicast mode to other STAs is similar to the transmission process between AP2 and STA1 shown in FIG. 2, which will not be described in detail here. It should be noted that, FIG. 2 only shows that AP2 sends the video stream to STAs in unicast mode, and those skilled in the art should understand that, if AP2 determines in real time that the transmission mode is multicast mode, it will delete the destination unicast address in the received unicast video stream to obtain a multicast video stream, and transmit that multicast video stream directly to the respective stations in multicast transmission mode.

Figure 3:
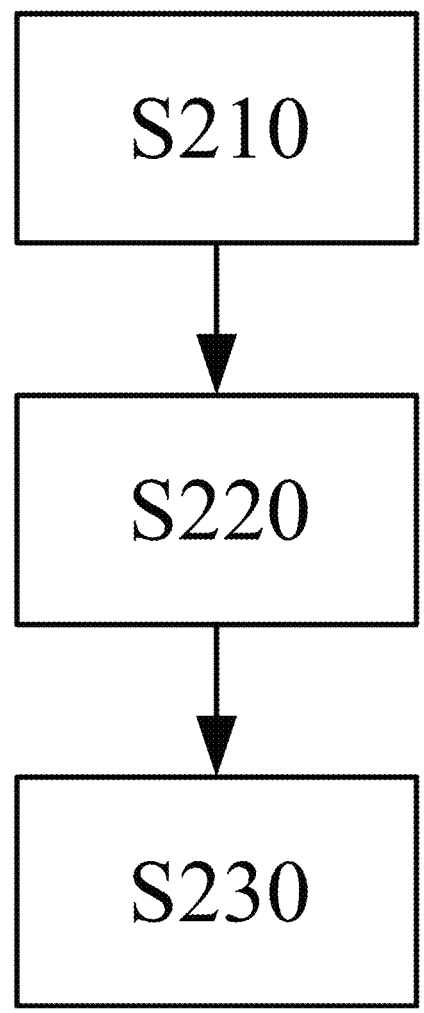
FIG. 3 shows a flowchart of a method for transmitting multiple video streams in an access point in a WiFi mesh network according to an embodiment of the present disclosure.

FIG. 3 shows a flowchart of a method for transmitting multiple video streams in an access point in a WiFi mesh network according to an embodiment of the present disclosure. The method of this embodiment may be implemented in any access point (such as the root access point or any of the subsequent access points) in the WiFi mesh network. The method according to the present embodiment includes step S210, step S220 and step S230.

In step S210, for multiple video streams that are received, the access point creates multiple video queues at the application layer, wherein each video queue contains one of the multiple video streams. Wherein, the respective video stream in the multiple video streams may be for example a unicast video stream from the uplink or a multicast video stream from the uplink.

As an example, the access point receives the following 3 video streams from the uplink: VideoStream1, VideoStream2, VideoStream3; the access point creates 3 video queues corresponding respectively to those 3 video streams at the application layer, wherein video queue Queue1 is used to store VideoStream1, video queue Queue2 is used to store VideoStream2, and video queue Queue3 is used to store VideoStream3.

In step S220, for each video queue, the access point determines the weight of the video queue according to link related information corresponding to the video stream contained in the video queue.

Wherein, the weight of a video queue is used to indicate the priority of the video queue. For example, the priority of a video queue is higher when its weight value is higher, or the priority of a video queue is higher when its weight value is lower. Optionally, when multiple video queues are created at the application layer, each video queue corresponds to the same default weight, thereafter, the access point may determine and adjust in real time the weight of the video queue according to the link related information corresponding to the video stream contained in that video queue.

Wherein, the link related information includes any information related to the link for transmitting data stream, such as the ingress rate of the uplink corresponding to the video stream calculated by the access point when the video stream is received, the link speed between the access point and the node to which the video stream needs to be transmitted, and so on. For example, the access point may determine the weights of the video queues corresponding to the respective video streams according to the link speeds between the access point and the nodes to which the respective video streams need to be transmitted, if the priority of a video queue is higher when its weight value is lower, then the higher the link speed between the access point and a node to which that a video stream needs to be transmitted, the lower the weight value of the video queue corresponding to the video stream; if the priority of a video queue is higher when its weight value is higher, then the higher the link speed between the access point and a node to which that a video stream needs to be transmitted, the higher the weight value of the video queue corresponding to the video stream.

In some embodiments, the step S220 further includes: calculating, for each video queue, a queue metric corresponding to the video queue according to the ingress rate and link speed corresponding to the video queue, and determining the weight of the video queue according to the queue metric corresponding to the video queue. Wherein, the queue metric is equivalent to a metric between the stream ingress rate at the application layer and the output stream at the MAC layer.

Preferably, the operation of calculating a queue metric corresponding to that video queue according to the ingress rate and link speed corresponding to the video queue includes:

calculating the queue metric corresponding to the video queue according to the ingress rate and link speed corresponding to the video queue based on the following formula:

$$QueueMetrics(x) = \begin{cases} IngressVideo(x) - LinkSpeed(x) & IngressVideo(x) > LinkSpeed(x) \\ 0 & IngressVideo(x) \leq LinkSpeed(x) \end{cases}$$

wherein, x represents the number of a video queue, QueueMetrics(x) represents the queue metric corresponding to the video queue numbered x, IngressVideo(x) represents the ingress rate corresponding to the video queue numbered x, and LinkSpeed(x) represents the link speed between the access point and the node to which the video queue numbered x needs to be transmitted. If the queue metric corresponding to a video queue is close to 1, it means that the link speed corresponding to the video queue is far less than the ingress rate and more video packets will be lost during transmission, and also means that the link status is not enough to provide video transmission and video playing; if the queue metric corresponding to the video queue is close to 0, it means the wireless link quality and STA capabilities are enough to provide video transmission and video playing.

It should be noted that the above formula for calculating the queue metric is only an example, and not intended to limit the present disclosure, and any implementation of calculating, for each video queue, a queue metric corresponding to the video queue according to the ingress rate and link speed corresponding to the video queue (such as a simple transformation of the above formula for calculating a queue metric), should be included in the protection scope of the present disclosure.

Wherein, the access point dynamically assigns a different weight to each video queue according to the queue metric corresponding to each video queue, with the purpose being to be able to send video streams in an effective manner when the link connection and STA capabilities are good, so that high resolution terminals (such as 4k TVs) with good wireless connections could have good video quality. In some embodiments, the principle of assigning a different weight to each video queue is to assign a higher priority to the video queue with a lower queue metric, so that the video queue with higher priority will transmit more packets from the application layer to the MAC layer. As an example, four weight values (0, 1, 2, 3) are set in advance, the greater the weight value, the lower the priority (i.e., weight value 0 indicates the highest priority, and weight value 3 indicates the lowest priority), the access point determines the weight of a video queue according to the queue metric corresponding to the video queue based on the following formula:

$$QueueWeight = \begin{cases} 0 & IngressVideo \leq LinkSpeed \\ 1 & 0 < QueueMetrics \leq 0.3 \\ 2 & 0.3 < QueueMetrics \leq 0.6 \\ 3 & 0.6 < QueueMetrics \leq 1 \end{cases}$$

wherein, QueueWeight represents the weight of a video queue, QueueMetrics represents the queue metric corresponding to a video queue, IngressVideo represents the ingress rate of the uplink corresponding to a video queue, and LinkSpeed represents the link speed between the access point and a node to which the video stream in a video queue needs to be transmitted; for example, the access point obtains the queue metrics corresponding to the video queues Queue1, Queue2, Queue3 as 0.4, 0.7, 0, based on the above formula for calculating the queue metric, then the access point determines that the weights of the video queues Queue1, Queue2, Queue3 are 2, 3, 0 respectively, based on the formula for determining the weight of a video queue (i.e., Queue3 has the highest priority, Queue1 has the lower priority, and Queue2 has the lowest priority).

In some embodiments, that method further includes: collecting physical link metrics and generating QoS measurement information at the MAC layer; transmitting the QoS measurement information from the MAC layer to the application layer; calculating, at the application layer, the link speed corresponding to each video queue according to the QoS measurement information from the MAC layer. Preferably, the access point further performs the following operation after generating QoS measurement information at the MAC layer: if the average link QoS is determined to be lower than a quality threshold according to the QoS measurement information, adjusting the contention parameters of the access category queues, this operation may be performed in parallel with the above operation of "transmitting the QoS measurement information from the MAC layer to the application layer". Based on the above, by learning from the QoS measurement information within a certain period, the access point may calculate the link speed between the access point and each of its associated stations according to the QoS measurement information from the MAC layer, and therefore can adjust adaptively the weights of the respective video queues at the application layer. As an example, the MAC layer collects physical link metrics and generates QoS measurement information, such as Dot11QoSCountersEntry, Dot11QoSCountersEntry contains failed count, retry count, discarded frame count, etc., if it is determined that the QoS of the link connection is good according to the QoS measurement information, the MAC layer will transmit the video stream using default parameters. If it is determined that the average link QoS is lower than a quality threshold according to the QoS measurement information, the contention parameters (CWmax, CWmin, TXOP, AIFS) of the access category queues are adjusted at the MAC layer to make the video stream have a low priority, this adaptive adjustment is to make the video transmission speed consistent with the QoS of the link connection. In addition, after the QoS measurement information is generated at the MAC layer, the QoS measurement information is provided to the application layer in parallel.

Figure 4:
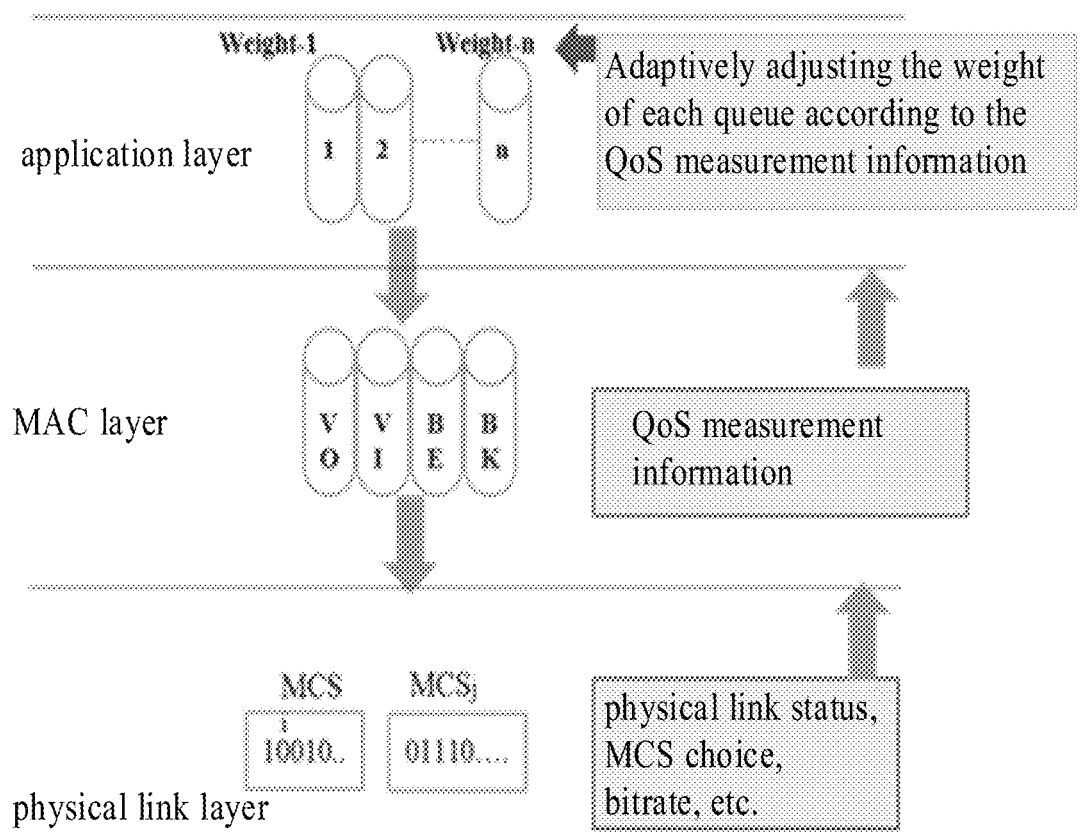
FIG. 4 shows a schematic diagram of adaptive multiple video queues management according to an example of the present disclosure.

By collecting physical link metrics and generating QoS measurement information at the MAC layer, and transmitting the QoS measurement information from the MAC layer to the application layer, it can calculate the link speed corresponding to each video queue based on the QoS measurement information at the application layer, thereby enabling the access point to calculate the queue metric corresponding to each video queue based on the link speed corresponding to each video queue at the application layer, the queue metric is equivalent to establishing the mapping between the QoS measurement at the MAC layer and the QoE (Quality of Experience) at the application layer, based on this, adaptive multiple video queues management can be achieved at the application layer. FIG. 4 shows a schematic diagram of adaptive multiple video queues management according to an example of the present disclosure, wherein for the n video streams received by an access point, n video queues corresponding respectively to those n video streams are created at the application layer, and the weight corresponding to the xth (x=1, 2, . . . , n) video queue being denoted as "Weight-x". Four access category queues VO (voice service), VI (video service), BE (best effort service), BK (background service) defined in 802.11e are shown in the MAC layer, wherein only the VI queue is used for transmitting video data, then the application layer transmits video packets to the VI queue of the MAC layer according to the priority of each video queue, the MAC layer transmits the video packets through the VI queue to the physical link layer; wherein, the MAC layer will collect physical link metrics (such as physical link status, MCS choice ($MCS_i$, $MCS_j$ as shown in FIG. 4), bitrate, and so on) from the physical link layer, and generate QoS measurement information (including failed count, retry count, discarded frame count, etc.) according to the physical link metrics, then, if it is determined that the average link QoS is lower than a quality threshold according to the QoS measurement information, the contention parameters of the access category queues are adjusted at the MAC layer, and the MAC layer provides the generated QoS measurement information to the application layer in parallel, After receiving the QoS measurement information, the application layer adaptively adjust the weight of each video queue in the application layer according to the latest QoS measurement information, thereby, implementing adaptive multiple video queues management of the multi-layer structure.

In step S230, the access point transmits the multiple video streams from the application layer to the MAC layer according to the weight of each video queue. Wherein, the higher the priority of the video queue, the more packets will be transmitted from the application layer to the MAC layer.

The method of this embodiment further includes introducing a ZeroVideoFrameLost mechanism in backhaul link and in fronthaul link of a WiFi mesh network to further improve video quality. Based on the ZeroVideoFrameLost mechanism, the reliability of video stream transmission can be guaranteed, and retransmission of video packets can be supported both in backhaul link and in fronthaul link. What needs to be explained first is that video compression has multiple frame types, including: Intra-Prediction frame (I-frame), Bi-prediction frame (B-frame), Prediction frame (P-frame); wherein, an I-frame is compressed according to intra-frame information, a P-frame will use a past compressed frame as reference, and a B-frame will use both a past compressed frame and a future frame, the number of I-frames occupies a very small part of the video stream, but they are the most important frames. If I-frame is lost, video quality will be significantly reduced immediately, the ZeroVideoFrameLost mechanism of the present disclosure also takes into account the importance of I-frame, and therefore can achieve better QoE. The ZeroVideoFrameLost mechanism will be described in detail in the following.

In some embodiments, that method further includes performing the following operation while creating multiple video queues at the application layer: creating a first additional queue for storing I-frame packets and a second additional queue for storing other failure packets at the application layer; wherein the method further includes: copying, at the application layer whenever a new I-frame is transmitted to the MAC layer, the I-frame to the first additional queue in parallel, and recording the index and weight of the video queue corresponding to the video stream to which the I-frame belongs.

Wherein, the first additional queue and the second additional queue are two video queues additionally created at the application layer, and these two video queues can be used for transmission of different types of failure packets.

In some embodiments, that method further includes performing the following operations after transmitting a video stream to a corresponding node: notifying, at the MAC layer, the application layer of failure information corresponding to that video stream when it is detected that no acknowledgement message is received from that node; determining, at the application layer, whether the failure packet is an I-frame according to the failure information from the MAC layer, and if the failure packet is an I-frame, transmitting the failed I-frame from the first additional queue to the MAC layer according to the index and weight of the video queue corresponding to the video stream to which the failed I-frame belongs and in connection with the weight of the first additional queue, otherwise, storing the failure packet to the second additional queue and transmitting the failure packet from the second additional queue to the MAC layer according to the weight of the second additional queue in order to retransmit the failure packet.

Figure 5:
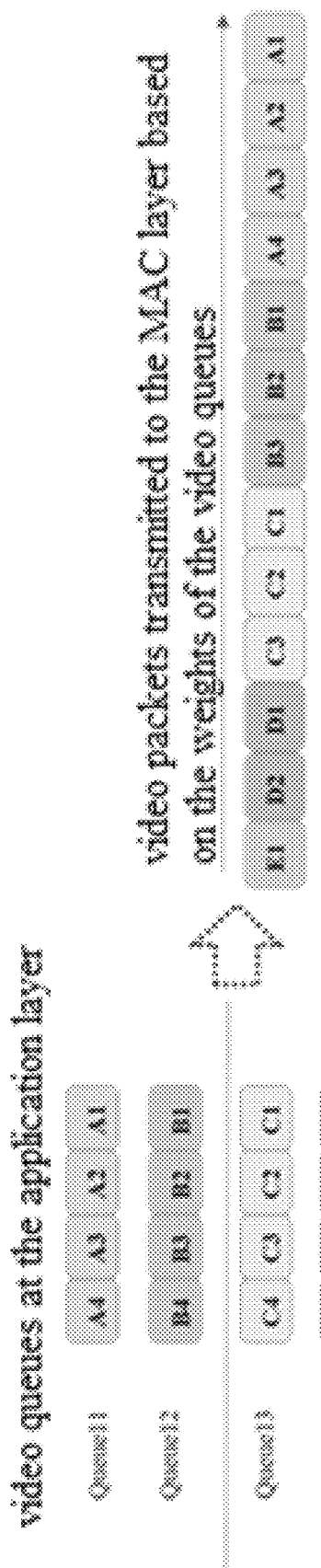
FIG. 5 shows a schematic diagram of transmitting video packets from the application layer to the MAC layer according to an example of the present disclosure.

Preferably, the weights of the first additional queue and the second additional queue may be preset, and the priority indicated by the weight of the first additional queue is higher than the priority indicated by the weight of the second additional queue. Preferably, the weight of the first additional queue corresponds to the highest priority, and the weight of the second additional queue corresponds to the next highest priority, then when an I-frame fails, the application layer determines immediately the I-frame that needs to be retransmitted according to the index of the video queue corresponding to the video stream to which the failed I-frame belongs, and pushes that I-frame with the highest priority which needs to be retransmitted from the first additional queue to the MAC layer for transmission. Preferably, the maximum number of times of I-frame retransmission may be defined in advance, for example, an I-frame can be retransmitted at most 3 times, and if failure still occurs after 3 times of retransmission, it means link quality is poor. Optionally, the first additional queue, the second additional queue and the multiple video queues corresponding to the multiple video streams may share a same formula for determining the weight of a video queue; as an example, 4 weight values (0, 1, 2, 3) are preset, the larger the weight value, the lower the priority, and the weight of each video queue is determined at the application layer based on the following formula:

$$QueueWeight = \begin{cases} 0 & IngressVideo \leq LinkSpeed, \text{ or retransmission of } I\text{-frame} \\ 1 & 0 < QueueMetrics \leq 3, \text{ or retransmission of other failure packets} \\ 2 & 0.3 < QueueMetrics \leq 0.6 \\ 3 & 0.6 < QueueMetrics \leq 1 \end{cases}$$

based on that formula, when an I-frame is retransmitted, the weight of the video queue for retransmission the I-frame (i.e. the first additional queue) is 0 (i.e. the highest priority), and when other packets are retransmitted, the weight of the video queue for retransmission the I-frame (i.e. the second additional queue) is 1. FIG. 5 shows a schematic diagram of transmitting video packets from the application layer to the MAC layer according to an example of the present disclosure, it shows five video queues at the application layer and part of the packets in each video queue, wherein Queue11 is the first additional queue for retransmission of I-frames, Queue12 is the second additional queue for retransmission of other failure packets, and Queue13, Queue 14, Queue15 are three video queues corresponding respectively to three video streams, the weights of Queue11, Queue12, Queue13, Queue14, Queue15 are respectively 0, 1, 1, 2, 3 (wherein the larger the weight value, the lower the priority). It can be seen based on FIG. 5 that the lower the weight of a video queue (i.e. the higher the priority), the more packets of that video queue are transmitted from the application layer to the MAC layer, for example, the number of packets transmitted to the MAC layer in Queue11 is 4 (A1, A2, A3, A4), the number of packets transmitted to the MAC layer in Queue12 is 3 (B1, B2, B3), the number of packets transmitted to the MAC layer in Queue13 is 3 (C1, C2, C3), the number of packets transmitted to the MAC layer in Queue14 is 2 (D1, D2), and the number of packets transmitted to the MAC layer in Queue15 is 1 (E1).

According to the scheme of this embodiment, By creating multiple video queues corresponding to multiple video streams at the application layer and adaptively adjusting the weight of each video queue according to the actual link conditions, those multiple video streams can be transmitted from the application layer to the VI queue at the MAC layer based on the weight of each video queue and thereby enabling distinguishing multiple video streams from each other in WiFi mesh network, and therefore better video quality can be achieved. Furthermore, a multi-layer structure of adaptive multiple queues management is established in each access point to support video stream transmission with good QoS for heterogeneous stations. In addition, by creating a first additional queue and a second additional queue at the application layer, retransmission of I-frames and other failure packets can be achieved, in particular, treating I-frames as the frames with the highest priority among all the video frames transmitted to STAs is supported, so that an I-frame can be retransmitted immediately when failure occurs and thereby ensuring user experience quality.

It should be noted that the method for transmitting multicast video and the method for transmitting multiple video streams described in the present disclosure can be combined (i.e., the method of the embodiment shown in FIG. 1 and the method of the embodiment shown in FIG. 3 can be combined), for example, in the process of performing the method for transmitting multiple video streams described in the present disclosure, if there exist multicast video stream(s) in those multiple video streams, the access point may transmit the multicast video stream(s) to the corresponding stations based on the method for transmitting multicast video described in the present disclosure. For another example, when transmitting multicast video, the present disclosure may introduce the structure of multiple queues management shown in FIG. 4, such as collecting physical link metrics and generating QoS measurement information at the MAC layer and transmitting the QoS measurement information from the MAC layer to the application layer in order to determine in real time the transmission mode between the AP and the STAs according to the QoS measurement information at the application layer (for example, calculating the total throughput according to the QoS measurement information and thereby determining the transmission mode between the AP and each STA), the ZeroVideoFrameLost mechanism described in the embodiment shown in FIG. 3 may also be introduced to achieve retransmission of multicast video packets.

Figure 6:
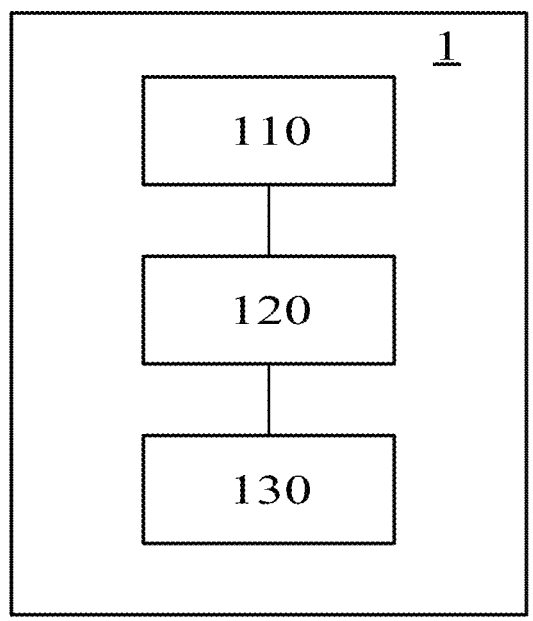
FIG. 6 shows a structural diagram of a first apparatus for transmitting multicast video in an access point in a WiFi mesh network according to an embodiment of the present disclosure.

FIG. 6 shows a structural diagram of a first apparatus for transmitting multicast video in an access point in a WiFi mesh network according to an embodiment of the present disclosure. In this embodiment, the root access point (root AP) in the WiFi mesh network supports IGMP (Internet Group Management Protocol) Proxy for IGMP Layer 3 convergence, and the subsequent access points (i.e. the non-root APs) support IGMP Snooping, therefore a mapping table between stations and multicast address is established in the root access point and its subsequent access points in the WiFi mesh network. The access point may be any access point (such as the root access point or any of the subsequent access points) in the WiFi mesh network. The first apparatus 1 shown in FIG. 6 includes means for receiving a video stream and determining the node(s) to which the video stream needs to be transmitted (hereinafter referred to as "first determining means 110"), means for determining dynamically a transmission mode of the video stream and transmitting corresponding video stream to multiple stations using the transmission mode when the nodes are the multiple stations corresponding to the multicast address (hereinafter referred to as "first transmitting means 120"), and means for transmitting corresponding video stream to a next access point using unicast mode when the node is the next access point (hereinafter referred to as "second transmitting means 130").

The first determining means 110 is for receiving a video stream, and determining the node(s) to which the video stream needs to be transmitted, wherein the video stream includes a multicast address.

Wherein, the video stream may be a multicast video stream from a sending source (or referred to as "video source", such as a cloud server and the like), or may be a unicast video stream converted based on the multicast video stream. The access point can determine that the video stream is based on the multicast video from the sending source according to the multicast address in the video stream, that is, this transmission process is a transmission process for the multicast video.

Wherein, the node(s) to which the video stream needs to be transmitted may be multiple stations corresponding to the multicast address (i.e., the video stream needs to be transmitted to STAs), or may be a next level access point of this access point.

In some embodiments, the first determining means 110 in a root access point receives a multicast video stream from the uplink, and checks whether the node(s) to which the multicast video stream needs to be transmitted is/are a next access point or STAs. In some other embodiments, the first determining means 110 in a subsequent access point of a root access point receives a unicast video stream from its upper access point, this unicast video stream is obtained by multicast-to-unicast conversion based on a multicast video stream from the sending source, this unicast video stream includes therein a destination unicast address pointing to this subsequent access point and the multicast address, this subsequent access point checks whether the node(s) to which that unicast video stream needs to be transmitted is/are a next access point or STAs.

The first transmitting means 120 is for determining dynamically a transmission mode of the video stream, and transmitting corresponding video stream to multiple stations using the transmission mode when the nodes are the multiple stations corresponding to the multicast address.

Specifically, when the video stream needs to be transmitted to STAs, the first transmitting means 120 in the access point determines dynamically whether the transmission mode of the video stream is multicast mode or unicast mode, and obtains multiple video streams that need to be transmitted respectively to the multiple STAs based on the determined transmission mode and the video stream, and transmits those multiple video streams respectively to the corresponding STAs with the determined transmission mode.

Wherein, the first transmitting means 120 may adaptively select whether to adopt multicast mode or unicast mode based on the actual link conditions between the access point and each station in the multiple stations.

In some embodiments, the operation of the access point determining dynamically a transmission mode of the video stream includes: calculating a total throughput according to the currently supported traffic between the access point and each of the multiple stations; determining the transmission mode of the video stream according to the total throughput.

Optionally, the first transmitting means 120 calculates the total throughput according to the currently supported traffic between the access point and each station based on the following formula:

$$TotalThroughput = \sum_{y=1}^{n} VideoStream(y)$$

wherein, TotalThroughput represents the total throughput, y represents the number of video stream with y=(1, 2 . . . n), n represents the number of multicast members (i.e. the number of the multiple stations), and VideoStream(y) represents the currently supported traffic between the access point and the station to which the video stream numbered y is to be transmitted. It should be noted that the above formula for calculating the total throughput is only an example, and not intended to limit the present disclosure. Those skilled in the art should understand that any implementation for calculating the total throughput according to the currently supported traffic between the access point and each of the multiple stations (such as a simple transformation of the above formula for calculating the total throughput), should be included in the protection scope of the present disclosure.

Optionally, the operation of determining the transmission mode of the video stream according to the total throughput includes: determining that the transmission mode of the video stream is multicast mode when the total throughput is greater than or equal to a throughput threshold; determining that the transmission mode of the video stream is unicast mode when the total throughput is less than the throughput threshold. Wherein, each access point maintains therein a throughput threshold supported by that access point, and optionally, the throughput threshold can adjust dynamically.

In some embodiments, the access point is the root access point, the video stream is a multicast video stream from the uplink, the operation of transmitting corresponding video stream to multiple stations using the transmission mode includes: transmitting the multicast video stream directly to the multiple stations using multicast mode if the transmission mode is multicast mode; converting, for each station in the multiple stations, the multicast video stream to a unicast video stream that includes a destination unicast address pointing to that station and transmitting that unicast video stream to that station using unicast mode if the transmission mode is unicast mode. Wherein, if the first transmitting means 120 determines dynamically that the transmission mode of the multicast video stream is multicast mode, the first transmitting means 120 transmits the video stream respectively to the corresponding stations directly. Wherein, if the first transmitting means 120 determines dynamically that the transmission mode of the multicast video stream is unicast mode, for each station in the multiple stations, the first transmitting means 120 adds a destination unicast address pointing to that station in the video stream obtained by replication based on the multicast video stream, i.e. converts the multicast video stream to a unicast video stream that includes a destination unicast address pointing to that station, and transmits that unicast video stream to that station using unicast mode; if unicast mode is used between the access point and a station, the multicast address may be deleted while adding a destination unicast address pointing to that station.

In some embodiments, the access point is a non-root access point, the video stream is a unicast video stream from the upper node of the access point, that unicast video stream includes therein a destination unicast address pointing to the access point and the multicast address, the operation of transmitting corresponding video stream to the multiple stations using the transmission mode includes: deleting the destination unicast address in that unicast video stream to obtain a multicast video stream and transmitting the obtained multicast video stream to the multiple stations using multicast mode if the transmission mode is multicast mode; modifying, for each station in the multiple stations, the destination unicast address pointing to that access point in that unicast video stream to a destination unicast address pointing to that station and transmitting the modified unicast video stream to that station using unicast mode if the transmission mode is unicast mode.

The second transmitting means 130 is for transmitting corresponding video stream to a next access point using unicast mode when the node is the next access point.

In some embodiments, the access point is the root access point, the video stream is a multicast video stream from the uplink, the second transmitting means 130 is further for: converting the multicast video stream to a unicast video stream and transmitting the unicast video stream to the next access point using unicast mode when the node is a next access point, wherein, the unicast video stream includes therein the multicast address and a destination unicast address pointing to the next access point.

In some embodiments, the access point is a non-root access point, the video stream is a unicast video stream from the upper access point, this unicast video stream includes therein the multicast address and a destination unicast address pointing to the access point, the second transmitting means 130 is further for: modifying, when the node is a next access point, the destination unicast address pointing to the access point in the unicast video stream to a destination unicast address pointing to the next access point, and transmitting this unicast video stream to the next access point using unicast mode.

In some embodiments, the transmission operations performed in the first transmitting means 120 and the second transmitting means 130 include: adjusting the priority of the access category queue for transmitting video stream to highest at the MAC layer, in order to transmit corresponding video stream to the multiple stations or to the next access point. Wherein, the access category queue for transmitting video stream is the AC_VI queue defined in 802.11e.

In some embodiments, a ZeroVideoFrameLost mechanism may be introduced in backhaul link and in fronthaul link, that is, if an access point does not receive an acknowledgement (ACK) message from other node after sending video packets to the other node, that access point will store the failure packets in the corresponding queue at the application layer and retransmit in the specified time slot for video playing, so that retransmission of multicast video packets can be achieved in WiFi mesh network. The specific implementations of the ZeroVideoFrameLost mechanism described in the subsequent embodiments can also be applied to the multicast video stream in this embodiment, which will not be described in detail here.

According to the scheme of this embodiment, a new transmission mechanism for transmitting multicast video in WiFi mesh network is established, the multicast video can be converted to a unicast video stream in backhaul link, the transmission mode may be determined in real time in an access point according to the actual link conditions in fronthaul link, i.e., adaptively selecting whether the fronthaul link adopts multicast mode or unicast mode, thereby ensuring the experience quality of multicast video, and achieving reliable transmission of multicast videos in WiFi mesh network.

Figure 7:
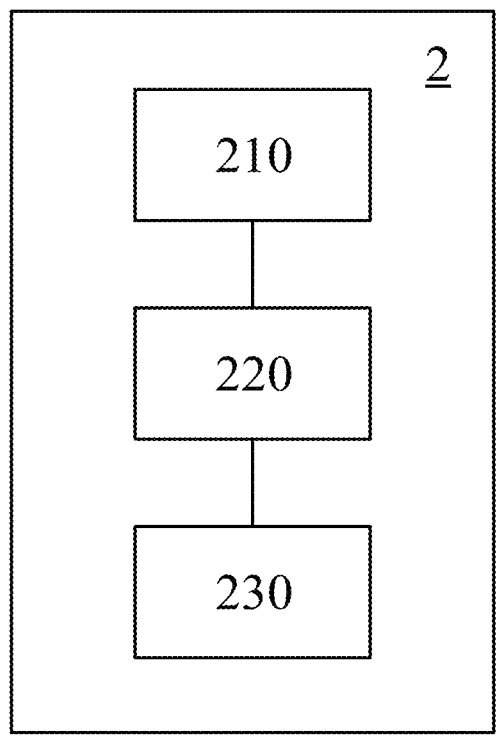
FIG. 7 shows a structural diagram of a second apparatus for transmitting multiple video streams in an access point in a WiFi mesh network according to an embodiment of the present disclosure.

FIG. 7 shows a structural diagram of a second apparatus for transmitting multiple video streams in an access point in a WiFi mesh network according to an embodiment of the present disclosure. The access point may be any access point (such as the root access point or any of the subsequent access points) in the WiFi mesh network. The second apparatus 2 shown in FIG. 7 includes means for creating, for multiple video streams that are received, multiple video queues at the application layer (hereinafter referred to as "first creating means 210"), means for determining, for each video queue, the weight of the video queue according to link related information corresponding to the video stream contained in the video queue (hereinafter referred to as "second determining means 220"), means for transmitting the multiple video streams from the application layer to the MAC layer according to the weight corresponding to each video queue (hereinafter referred to as "third transmitting means 230").

The first creating means 210 is for creating, for multiple video streams that are received, multiple video queues at the application layer, wherein each video queue contains one of the multiple video streams. Wherein, the respective video stream in the multiple video streams may be for example a unicast video stream from the uplink or a multicast video stream from the uplink.

As an example, the access point receives the following 3 video streams from the uplink: VideoStream1, VideoStream2, VideoStream3; the first creating means 210 in the access point creates 3 video queues corresponding respectively to those 3 video streams at the application layer, wherein video queue Queue1 is used to store VideoStream1, video queue Queue2 is used to store VideoStream2, and video queue Queue3 is used to store VideoStream3.

The second determining means 220 is for determining, for each video queue, the weight of the video queue according to link related information corresponding to the video stream contained in the video queue.

Wherein, the weight of a video queue is used to indicate the priority of the video queue. For example, the priority of a video queue is higher when its weight value is higher, or the priority of a video queue is higher when its weight value is lower. Optionally, when multiple video queues are created at the application layer, each video queue corresponds to the same default weight, thereafter, the second determining means 220 may determine and adjust in real time the weight of the video queue according to the link related information corresponding to the video stream contained in that video queue.

Wherein, the link related information includes any information related to the link for transmitting data stream, such as the ingress rate of the uplink corresponding to the video stream calculated by the access point when the video stream is received, the link speed between the access point and the node to which the video stream needs to be transmitted, and so on. For example, the second determining means 220 may determine the weights of the video queues corresponding to the respective video streams according to the link speeds between the access point and the nodes to which the respective video streams need to be transmitted, if the priority of a video queue is higher when its weight value is lower, then the higher the link speed between the access point and a node to which that a video stream needs to be transmitted, the lower the weight value of the video queue corresponding to the video stream; if the priority of a video queue is higher when its weight value is higher, then the higher the link speed between the access point and a node to which that a video stream needs to be transmitted, the higher the weight value of the video queue corresponding to the video stream.

In some embodiments, the second determining means 220 is further for: calculating, for each video queue, a queue metric corresponding to the video queue according to the ingress rate and link speed corresponding to the video queue, and determining the weight of the video queue according to the queue metric corresponding to the video queue. Wherein, the queue metric is equivalent to a metric between the stream ingress rate at the application layer and the output stream at the MAC layer.

Preferably, the operation of calculating a queue metric corresponding to that video queue according to the ingress rate and link speed corresponding to the video queue includes:

calculating the queue metric corresponding to the video queue according to the ingress rate and link speed corresponding to the video queue based on the following formula:

$$QueueMetrics(x) = \begin{cases} IngressVideo(x) - LinkSpeed(x) & IngressVideo(x) > LinkSpeed(x) \\ 0 & IngressVideo(x) \leq LinkSpeed(x) \end{cases}$$

wherein, x represents the number of a video queue, QueueMetrics(x) represents the queue metric corresponding to the video queue numbered x, IngressVideo(x) represents the ingress rate corresponding to the video queue numbered x, and LinkSpeed(x) represents the link speed between the access point and the node to which the video queue numbered x needs to be transmitted. If the queue metric corresponding to a video queue is close to 1, it means that the link speed corresponding to the video queue is far less than the ingress rate and more video packets will be lost during transmission, and also means that the link status is not enough to provide video transmission and video playing; if the queue metric corresponding to the video queue is close to 0, it means the wireless link quality and STA capabilities are enough to provide video transmission and video playing.

It should be noted that the above formula for calculating the queue metric is only an example, and not intended to limit the present disclosure, and any implementation of calculating, for each video queue, a queue metric corresponding to the video queue according to the ingress rate and link speed corresponding to the video queue (such as a simple transformation of the above formula for calculating a queue metric), should be included in the protection scope of the present disclosure.

Wherein, the second determining means 220 dynamically assigns a different weight to each video queue according to the queue metric corresponding to each video queue, with the purpose being to be able to send video streams in an effective manner when the link connection and STA capabilities are good, so that high resolution terminals (such as 4k TVs) with good wireless connections could have good video quality. In some embodiments, the principle of assigning a different weight to each video queue is to assign a higher priority to the video queue with a lower queue metric, so that the video queue with higher priority will transmit more packets from the application layer to the MAC layer. As an example, four weight values (0, 1, 2, 3) are set in advance, the greater the weight value, the lower the priority (i.e., weight value 0 indicates the highest priority, and weight value 3 indicates the lowest priority), the second determining means 220 determines the weight of a video queue according to the queue metric corresponding to the video queue based on the following formula:

$$QueueWeight = \begin{cases} 0 & IngressVideo \leq LinkSpeed \\ 1 & 0 < QueueMetrics \leq 0.3 \\ 2 & 0.3 < QueueMetrics \leq 0.6 \\ 3 & 0.6 < QueueMetrics \leq 1 \end{cases}$$

wherein, QueueWeight represents the weight of a video queue, QueueMetrics represents the queue metric corresponding to a video queue, IngressVideo represents the ingress rate of the uplink corresponding to a video queue, and LinkSpeed represents the link speed between the access point and a node to which the video stream in a video queue needs to be transmitted; for example, the second determining means 220 obtains the queue metrics corresponding to the video queues Queue1, Queue2, Queue3 as 0.4, 0.7, 0, based on the above formula for calculating the queue metric, then the second determining means 220 determines that the weights of the video queues Queue1, Queue2, Queue3 are 2, 3, 0 respectively, based on the formula for determining the weight of a video queue (i.e., Queue3 has the highest priority, Queue1 has the lower priority, and Queue2 has the lowest priority).

In some embodiments, the second apparatus 2 further includes: means for collecting physical link metrics and generating QoS measurement information at the MAC layer (hereinafter referred to as "generating means", not shown); means for transmitting the QoS measurement information from the MAC layer to the application layer (hereinafter referred to as "fourth transmitting means", not shown); means for calculating, at the application layer, the link speed corresponding to each video queue according to the QoS measurement information from the MAC layer (hereinafter referred to as "calculating means", not shown). Preferably, the second apparatus 2 further includes an adjusting means (not shown) that performs operation after the generating means, the adjusting means is for adjusting the contention parameters of the access category queues if the average link QoS is determined to be lower than a quality threshold according to the QoS measurement information, the adjusting means and the fourth transmitting means can perform operations in parallel. Based on the above, by learning from the QoS measurement information within a certain period, the second determining means 220 may calculate the link speed between the access point and each of its associated stations according to the QoS measurement information from the MAC layer, and therefore can adjust adaptively the weights of the respective video queues at the application layer. As an example, the MAC layer collects physical link metrics and generates QoS measurement information, such as Dot11QoSCountersEntry, Dot11QoSCountersEntry contains failed count, retry count, discarded frame count, etc., if it is determined that the QoS of the link connection is good according to the QoS measurement information, the MAC layer will transmit the video stream using default parameters. If it is determined that the average link QoS is lower than a quality threshold according to the QoS measurement information, the contention parameters (CWmax, CWmin, TXOP, AIFS) of the access category queues are adjusted at the MAC layer to make the video stream have a low priority, this adaptive adjustment is to make the video transmission speed consistent with the QoS of the link connection. In addition, after the QoS measurement information is generated at the MAC layer, the QoS measurement information is provided to the application layer in parallel.

By collecting physical link metrics and generating QoS measurement information at the MAC layer, and transmitting the QoS measurement information from the MAC layer to the application layer, it can calculate the link speed corresponding to each video queue based on the QoS measurement information at the application layer, thereby enabling the access point to calculate the queue metric corresponding to each video queue based on the link speed corresponding to each video queue at the application layer, the queue metric is equivalent to establishing the mapping between the QoS measurement at the MAC layer and the QoE (Quality of Experience) at the application layer, based on this, adaptive multiple video queues management can be achieved at the application layer. FIG. 4 shows a schematic diagram of adaptive multiple video queues management according to an example of the present disclosure, wherein for the n video streams received by an access point, n video queues corresponding respectively to those n video streams are created at the application layer, and the weight corresponding to the xth (x=1, 2, . . . , n) video queue being denoted as "Weight-x". Four access category queues VO (voice service), VI (video service), BE (best effort service), BK (background service) defined in 802.11e are shown in the MAC layer, wherein only the VI queue is used for transmitting video data, then the application layer transmits video packets to the VI queue of the MAC layer according to the priority of each video queue, the MAC layer transmits the video packets through the VI queue to the physical link layer; wherein, the MAC layer will collect physical link metrics (such as physical link status, MCS choice ($MCS_i$, $MCS_j$ as shown in FIG. 4), bitrate, and so on) from the physical link layer, and generate QoS measurement information (including failed count, retry count, discarded frame count, etc.) according to the physical link metrics, then, if it is determined that the average link QoS is lower than a quality threshold according to the QoS measurement information, the contention parameters of the access category queues are adjusted at the MAC layer, and the MAC layer provides the generated QoS measurement information to the application layer in parallel, After receiving the QoS measurement information, the application layer adaptively adjust the weight of each video queue in the application layer according to the latest QoS measurement information, thereby, implementing adaptive multiple video queues management of the multi-layer structure.

The third transmitting means 230 is for transmitting the multiple video streams from the application layer to the MAC layer according to the weight of each video queue. Wherein, the higher the priority of the video queue, the more packets will be transmitted from the application layer to the MAC layer.

In some embodiments, the first creating means 110 is further for performing the following operation while creating multiple video queues at the application layer: creating a first additional queue for storing I-frame packets and a second additional queue for storing other failure packets at the application layer; wherein the method further includes: copying, at the application layer whenever a new I-frame is transmitted to the MAC layer, the I-frame to the first additional queue in parallel, and recording the index and weight of the video queue corresponding to the video stream to which the I-frame belongs.

Wherein, the first additional queue and the second additional queue are two video queues additionally created at the application layer, and these two video queues can be used for transmission of different types of failure packets.

In some embodiments, the second apparatus is further for performing the following operations after transmitting a video stream to a corresponding node: notifying, at the MAC layer, the application layer of failure information corresponding to that video stream when it is detected that no acknowledgement message is received from that node; determining, at the application layer, whether the failure packet is an I-frame according to the failure information from the MAC layer, and if the failure packet is an I-frame, transmitting the failed I-frame from the first additional queue to the MAC layer according to the index and weight of the video queue corresponding to the video stream to which the failed I-frame belongs and in connection with the weight of the first additional queue, otherwise, storing the failure packet to the second additional queue and transmitting the failure packet from the second additional queue to the MAC layer according to the weight of the second additional queue in order to retransmit the failure packet.

Preferably, the weights of the first additional queue and the second additional queue may be preset, and the priority indicated by the weight of the first additional queue is higher than the priority indicated by the weight of the second additional queue. Preferably, the weight of the first additional queue corresponds to the highest priority, and the weight of the second additional queue corresponds to the next highest priority, then when an I-frame fails, the application layer determines immediately the I-frame that needs to be retransmitted according to the index of the video queue corresponding to the video stream to which the failed I-frame belongs, and pushes that I-frame with the highest priority which needs to be retransmitted from the first additional queue to the MAC layer for transmission. Preferably, the maximum number of times of I-frame retransmission may be defined in advance, for example, an I-frame can be retransmitted at most 3 times, and if failure still occurs after 3 times of retransmission, it means link quality is poor. Optionally, the first additional queue, the second additional queue and the multiple video queues corresponding to the multiple video streams may share a same formula for determining the weight of a video queue; as an example, 4 weight values (0, 1, 2, 3) are preset, the larger the weight value, the lower the priority, and the weight of each video queue is determined at the application layer based on the following formula:

$$QueueWeight = \begin{cases} 0 & IngressVideo \leq LinkSpeed, \text{ or retransmission of } I\text{-frame} \\ 1 & 0 < QueueMetrics \leq 3, \text{ or retransmission of other failure packets} \\ 2 & 0.3 < QueueMetrics \leq 0.6 \\ 3 & 0.6 < QueueMetrics \leq 1 \end{cases}$$

based on that formula, when an I-frame is retransmitted, the weight of the video queue for retransmission the I-frame (i.e. the first additional queue) is 0 (i.e. the highest priority), and when other packets are retransmitted, the weight of the video queue for retransmission the I-frame (i.e. the second additional queue) is 1. FIG. 5 shows a schematic diagram of transmitting video packets from the application layer to the MAC layer according to an example of the present disclosure, it shows five video queues at the application layer and part of the packets in each video queue, wherein Queue11 is the first additional queue for retransmission of I-frames, Queue12 is the second additional queue for retransmission of other failure packets, and Queue13, Queue 14, Queue15 are three video queues corresponding respectively to three video streams, the weights of Queue11, Queue12, Queue13, Queue14, Queue15 are respectively 0, 1, 1, 2, 3 (wherein the larger the weight value, the lower the priority). It can be seen based on FIG. 5 that the lower the weight of a video queue (i.e. the higher the priority), the more packets of that video queue are transmitted from the application layer to the MAC layer, for example, the number of packets transmitted to the MAC layer in Queue11 is 4 (A1, A2, A3, A4), the number of packets transmitted to the MAC layer in Queue12 is 3 (B1, B2, B3), the number of packets transmitted to the MAC layer in Queue13 is 3 (C1, C2, C3), the number of packets transmitted to the MAC layer in Queue14 is 2 (D1, D2), and the number of packets transmitted to the MAC layer in Queue15 is 1 (E1).

According to the scheme of this embodiment, By creating multiple video queues corresponding to multiple video streams at the application layer and adaptively adjusting the weight of each video queue according to the actual link conditions, those multiple video streams can be transmitted from the application layer to the VI queue at the MAC layer based on the weight of each video queue and thereby enabling distinguishing multiple video streams from each other in WiFi mesh network, and therefore better video quality can be achieved. Furthermore, a multi-layer structure of adaptive multiple queues management is established in each access point to support video stream transmission with good QoS for heterogeneous stations. In addition, by creating a first additional queue and a second additional queue at the application layer, retransmission of I-frames and other failure packets can be achieved, in particular, treating I-frames as the frames with the highest priority among all the video frames transmitted to STAs is supported, so that an I-frame can be retransmitted immediately when failure occurs and thereby ensuring user experience quality.

The present disclosure also provides an access point, wherein, the access point includes: a memory for storing one or more programs; one or more processors connected with the memory, when executed by the one or more processors, the one or more programs cause the one or more processors to perform the method for transmitting multicast video in an access point in a WiFi mesh network described in the present disclosure.

The present disclosure also provides an access point, wherein, the access point includes: a memory for storing one or more programs; one or more processors connected with the memory, when executed by the one or more processors, the one or more programs cause the one or more processors to perform the method for transmitting multiple video streams in an access point in a WiFi mesh network described in the present disclosure The present disclosure also provides a computer readable storage medium storing a computer program, which when executed by a processor, cause the processor to perform the method for transmitting multicast video in an access point in a WiFi mesh network described in the present disclosure.

The present disclosure also provides a computer readable storage medium storing a computer program, which when executed by a processor, cause the processor to perform the method for transmitting multiple video streams in an access point in a WiFi mesh network described in the present disclosure.

The present disclosure also provides a computer program product, which when executed by a device, cause the device to perform the method for transmitting multicast video in an access point in a WiFi mesh network described in the present disclosure.

The present disclosure also provides a computer program product, which when executed by a device, cause the device to perform the method for transmitting multiple video streams in an access point in a WiFi mesh network described in the present disclosure.

It should be noted that the present disclosure can be implemented in software and/or a combination of software and hardware, for example, it may be implemented by an Application Specific Integrated Circuit (ASIC), a general-purpose computer, or any other similar hardware devices. In an embodiment, the software programs of the present disclosure may be executed by a processor so as to implement the above steps or functions. Likewise, the software programs of the present disclosure (including relevant data structure) may be stored in a computer readable recording medium, for example, a RAM memory, a magnetic or optical driver, or a floppy disk, and similar devices. Besides, some steps or functions of the present application can be implemented by hardware, for example, a circuit cooperating with the processor to execute various steps or functions.

Besides, a part of the present disclosure may be applied as a computer program product, for example, computer program instructions, which when executed by a computer, through the operation of the computer, may invoke or provide the method and/or technical solution of the present invention. Those skilled in the art should be understand that the forms of existence of the computer program instructions in the computer readable medium include but not limited to source files, executable files, installation package files, etc., accordingly, the ways in which the computer executes the computer program instructions include but not limited to: the computer executes those instructions directly, or the computer compiles the instructions and then executes the corresponding compiled program, or the computer reads and executes the instructions, or the computer reads and install those instructions and then executes the corresponding installed program. The computer readable medium herein may be any usable computer readable storage medium or communication medium available for computers to access.

The communication media includes the media by which communication signals are transmitted from one system to another system, wherein the communication signals include for example computer readable instructions, data structures, program modules or other data. Communication media may include guided transmission media (such as cables and wires (e.g., optical fibers, coaxials)) and wireless (non-guided transmission) media capable of propagating energy waves, such as acoustic, electromagnetic, RF, microwave and infrared. The computer readable instructions, data structures, program modules or other data may be embodied for example as modulated data signals in the wireless media (such as carrier ways or similar mechanism embodied as part of the spread spectrum technique). The term "modulated data signal" refers to a signal that has one or more characteristics set or changed in such a manner as to encode information in the signal. The modulation may be analogue, digital or hybrid modulation technique.

By way of example and not limitation, the computer readable storage media may include volatile and non-volatile, removable and non-removable media implemented by any method or technology for storing information such as computer readable instructions, data structures, program modules or other data. For example, the computer readable storage media include but not limited to: volatile memory, such as random access memory (RAM, DRAM, SRAM); non-volatile memory, such as FLASH, various read only memory (ROM, PROM, EPROM, EEPROM), magnetic and ferromagnetic/ferroelectric memory (MRAM, FeRAM); magnetic and optical storage devices (hard drive, magnetic tape, CD, DVD); or other now known or later developed media that can store computer readable information/data for use by a computer system.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

Although exemplary embodiments have been specifically shown and described above, those skilled in the art will appreciate that there may be changes in their form and details without departing from the spirit or scope of the claims. The protection sought herein is described in the appended claims. These and other aspects of the various embodiments are specified in the following numbering clauses:

1. A method for transmitting multicast video in an access point in a WiFi mesh network, wherein, said method includes:

receiving a video stream and determining the node(s) to which the video stream needs to be transmitted, wherein the video stream includes a multicast address;

determining dynamically a transmission mode of the video stream and transmitting corresponding video stream to multiple stations using the transmission mode when the nodes are the multiple stations corresponding to the multicast address;

transmitting corresponding video stream to a next access point using unicast mode when the node is the next access point.

2. The method according to clause 1, wherein, the operation of determining dynamically a transmission mode of the video stream includes:

calculating a total throughput according to the currently supported traffic between the access point and each of the multiple stations;

determining the transmission mode of the video stream according to the total throughput.

3. The method according to clause 2, wherein, the operation of determining the transmission mode of the video stream according to the total throughput includes:

determining that the transmission mode of the video stream is multicast mode when the total throughput is greater than or equal to a throughput threshold;

determining that the transmission mode of the video stream is unicast mode when the total throughput is less than the throughput threshold.

4. The method according to any of clauses 1 to 3, wherein, the video stream is a multicast video stream from the uplink, the operation of transmitting corresponding video stream to multiple stations using the transmission mode includes:

transmitting the multicast video stream directly to the multiple stations using multicast mode if the transmission mode is multicast mode;

converting, for each station in the multiple stations, the multicast video stream to a unicast video stream that includes a destination unicast address pointing to that station and transmitting that unicast video stream to that station using unicast mode if the transmission mode is unicast mode.

5. The method according to any of clauses 1 to 3, wherein, the video stream is a unicast video stream from the upper node, the unicast video stream includes a destination unicast address pointing to the access point and the multicast address, the operation of transmitting corresponding video stream to the multiple stations using the transmission mode includes:

deleting the destination unicast address in the unicast video stream to obtain a multicast video stream and transmitting the obtained multicast video stream to the multiple stations using multicast mode if the transmission mode is multicast mode;

modifying, for each station in the multiple stations, the destination unicast address pointing to the access point in the unicast video stream to a destination unicast address pointing to that station and transmitting the modified unicast video stream to that station using unicast mode if the transmission mode is unicast mode.

6. The method according to any of clauses 1 to 5, wherein, the video stream is a multicast video stream from the uplink, said transmitting corresponding video stream to a next access point using unicast mode when the node is the next access point includes:

converting the multicast video stream to a unicast video stream and transmitting the unicast video stream to the next access point using unicast mode when the node is a next access point, wherein, the unicast video stream includes therein the multicast address and a destination unicast address pointing to the next access point.

7. The method according to any of clauses 1 to 5, wherein, the video stream is a unicast video stream from the upper access point, the unicast video stream includes therein the multicast address and a destination unicast address pointing to the access point, said transmitting corresponding video stream to a next access point using unicast mode when the node is the next access point includes:

modifying, when the node is a next access point, the destination unicast address pointing to the access point in the unicast video stream to a destination unicast address pointing to the next access point, and transmitting this unicast video stream to the next access point using unicast mode.

8. The method according to any of clauses 1 to 7, wherein, the transmission operation includes:

adjusting the priority of the access category queue for transmitting video stream to highest at the MAC layer, in order to transmit corresponding video stream to the multiple stations or to the next access point.

9. A method for transmitting multiple video streams in an access point in a WiFi mesh network, wherein, the method includes:

creating, for the multiple video streams that are received, multiple video queues at the application layer, wherein each video queue contains one of the multiple video streams;

determining, for each video queue, the weight of the video queue according to link related information corresponding to the video stream contained in the video queue;

transmitting the multiple video streams from the application layer to the MAC layer according to the weight corresponding to each video queue, in order to transmit the multiple video streams to the corresponding node.

10. The method according to clause 9, wherein, said determining, for each video queue, the weight of the video queue according to link related information corresponding to the video stream contained in the video queue includes:

calculating, for each video queue, a queue metric corresponding to the video queue according to the ingress rate and link speed corresponding to the video queue, and determining the weight of the video queue according to the queue metric corresponding to the video queue.

11. The method according to clause 10, wherein, the operation of calculating a queue metric corresponding to the video queue according to the ingress rate and link speed corresponding to the video queue includes:

calculating the queue metric corresponding to the video queue according to the ingress rate and link speed corresponding to the video queue based on the following formula:

$$QueueMetrics(x) = \begin{cases} IngressVideo(x) - LinkSpeed(x) & IngressVideo(x) > LinkSpeed(x) \\ 0 & IngressVideo(x) \leq LinkSpeed(x) \end{cases}$$

wherein, x represents the number of a video queue, QueueMetrics(x) represents the queue metric corresponding to the video queue numbered x, IngressVideo(x) represents the ingress rate corresponding to the video queue numbered x, and LinkSpeed(x) represents the link speed between the access point and the node to which the video queue numbered x needs to be transmitted.

12. The method according to clause 10, wherein, the method further includes:

collecting physical link metrics and generating QoS measurement information at the MAC layer;

transmitting the QoS measurement information from the MAC layer to the application layer;

calculating, at the application layer, the link speed corresponding to each video queue according to the QoS measurement information from the MAC layer.

13. The method according to clause 12, wherein, the method further includes performing the following operations after generating QoS measurement information at the MAC layer:

adjusting the contention parameters of the access category queues if the average link QoS is determined to be lower than a quality threshold according to the QoS measurement information.

14. The method according to clause 9, wherein, said creating, for the multiple video streams that are received, multiple video queues at the application layer, further includes performing the following operation while creating multiple video queues at the application layer:

creating a first additional queue for storing I-frame packets and a second additional queue for storing other failure packets at the application layer;

wherein, the method further includes:

copying, at the application layer whenever a new I-frame is transmitted to the MAC layer, the I-frame to the first additional queue in parallel, and recording the index and weight of the video queue corresponding to the video stream to which the I-frame belongs.

15. The method according to clause 14, wherein, the method further includes the following operations performed after transmitting a video stream to a corresponding node:

notifying, at the MAC layer, the application layer of failure information corresponding to that video stream when it is detected that no acknowledgement message is received from that node;

determining, at the application layer, whether the failure packet is an I-frame according to the failure information from the MAC layer, and if the failure packet is an I-frame, transmitting the failed I-frame from the first additional queue to the MAC layer according to the index and weight of the video queue corresponding to the video stream to which the failed I-frame belongs and in connection with the weight of the first additional queue, otherwise, storing the failure packet to the second additional queue and transmitting the failure packet from the second additional queue to the MAC layer according to the weight of the second additional queue.

16. The method according to clause 15, wherein, the weight of the first additional queue corresponds to the highest priority, and the weight of the second additional queue corresponds to the next highest priority.

17. A first apparatus for transmitting multicast videos in an access point in a WiFi mesh network, wherein, the first apparatus includes:

means for receiving a video stream and determining the node(s) to which the video stream needs to be transmitted, wherein the video stream includes a multicast address;

means for determining dynamically a transmission mode of the video stream and transmitting corresponding video stream to multiple stations using the transmission mode when the nodes are the multiple stations corresponding to the multicast address;

means for transmitting corresponding video stream to a next access point using unicast mode when the node is the next access point.

18. The first apparatus according to clause 17, wherein, the operation of determining dynamically a transmission mode of the video stream includes:

calculating a total throughput according to the currently supported traffic between the access point and each of the multiple stations;

determining the transmission mode of the video stream according to the total throughput.

19. The first apparatus according to clause 18, wherein, the operation of determining the transmission mode of the video stream according to the total throughput includes:

determining that the transmission mode of the video stream is multicast mode when the total throughput is greater than or equal to a throughput threshold;

determining that the transmission mode of the video stream is unicast mode when the total throughput is less than the throughput threshold.

20. The first apparatus according to any of clause 17 to 19, wherein, the video stream is a multicast video stream from the uplink, the operation of transmitting corresponding video stream to multiple stations using the transmission mode includes:

transmitting the multicast video stream directly to the multiple stations using multicast mode if the transmission mode is multicast mode;

converting, for each station in the multiple stations, the multicast video stream to a unicast video stream that includes a destination unicast address pointing to that station and transmitting that unicast video stream to that station using unicast mode if the transmission mode is unicast mode.

21. The first apparatus according to any of clause 17 to 19, wherein, the video stream is a unicast video stream from the upper node, the unicast video stream includes a destination unicast address pointing to the access point and the multicast address, the operation of transmitting corresponding video stream to the multiple stations using the transmission mode includes:

deleting the destination unicast address in the unicast video stream to obtain a multicast video stream and transmitting the obtained multicast video stream to the multiple stations using multicast mode if the transmission mode is multicast mode;

modifying, for each station in the multiple stations, the destination unicast address pointing to the access point in the unicast video stream to a destination unicast address pointing to that station and transmitting the modified unicast video stream to that station using unicast mode if the transmission mode is unicast mode.

22. The first apparatus according to any of clause 17 to 21, wherein, the video stream is a multicast video stream from the uplink, said means for transmitting corresponding video stream to a next access point using unicast mode when the node is the next access point is for:

converting the multicast video stream to a unicast video stream and transmitting the unicast video stream to the next access point using unicast mode when the node is a next access point, wherein, the unicast video stream includes therein the multicast address and a destination unicast address pointing to the next access point.

23. The first apparatus according to any of clause 17 to 21, wherein, the video stream is a unicast video stream from the upper access point, the unicast video stream includes therein the multicast address and a destination unicast address pointing to the access point, said means for transmitting corresponding video stream to a next access point using unicast mode when the node is the next access point is for:

modifying, when the node is a next access point, the destination unicast address pointing to the access point in the unicast video stream to a destination unicast address pointing to the next access point, and transmitting this unicast video stream to the next access point using unicast mode.

24. The first apparatus according to any of clause 17 to 23, wherein, the transmission operation includes:

adjusting the priority of the access category queue for transmitting video stream to highest at the MAC layer, in order to transmit corresponding video stream to the multiple stations or to the next access point.

25. A second apparatus for transmitting video streams in an access point in a WiFi mesh network, wherein, the second apparatus includes:

means for creating, for multiple video streams that are received, multiple video queues at the application layer, wherein each video queue contains one of the multiple video streams;

means for determining, for each video queue, the weight of the video queue according to link related information corresponding to the video stream contained in the video queue;

means for transmitting the multiple video streams from the application layer to the MAC layer according to the weight corresponding to each video queue, in order to transmit the multiple video streams to the corresponding node.

26. The second apparatus according to clause 25, wherein, said means for determining, for each video queue, the weight of the video queue according to link related information corresponding to the video stream contained in the video queue is for:

calculating, for each video queue, a queue metric corresponding to the video queue according to the ingress rate and link speed corresponding to the video queue, and determining the weight of the video queue according to the queue metric corresponding to the video queue.

27 The second apparatus according to clause 26, wherein, the operation of calculating a queue metric corresponding to the video queue according to the ingress rate and link speed corresponding to the video queue includes:

calculating the queue metric corresponding to the video queue according to the ingress rate and link speed corresponding to the video queue based on the following formula:

$$QueueMetrics(x) =$$
$$\begin{cases} IngressVideo(x) - LinkSpeed(x) & IngressVideo(x) > LinkSpeed(x) \\ 0 & IngressVideo(x) \le LinkSpeed(x) \end{cases}$$

wherein, x represents the number of a video queue, QueueMetrics(x) represents the queue metric corresponding to the video queue numbered x, IngressVideo(x) represents the ingress rate corresponding to the video queue numbered x, and LinkSpeed(x) represents the link speed between the access point and the node to which the video queue numbered x needs to be transmitted.

28. The second apparatus according to clause 26, wherein, the second apparatus further includes:

means for collecting physical link metrics and generating QoS measurement information at the MAC layer;

means for transmitting the QoS measurement information from the MAC layer to the application layer;

means for calculating, at the application layer, the link speed corresponding to each video queue according to the QoS measurement information from the MAC layer.

29. The second apparatus according to clause 28, wherein, the second apparatus further includes the following that performs operation after said means for collecting physical link metrics and generating QoS measurement information at the MAC layer:

means for adjusting the contention parameters of the access category queues if the average link QoS is determined to be lower than a quality threshold according to the QoS measurement information.

30. The second apparatus according to clause 25, wherein, said means for creating, for the multiple video streams that are received, multiple video queues at the application layer is further for performing the following operation while creating multiple video queues at the application layer:

creating a first additional queue for storing I-frame packets and a second additional queue for storing other failure packets at the application layer;

wherein, the second apparatus further includes:

means for copying, at the application layer whenever a new I-frame is transmitted to the MAC layer, the I-frame to the first additional queue in parallel, and recording the index and weight of the video queue corresponding to the video stream to which the I-frame belongs.

31. The second apparatus according to clause 30, wherein, the second apparatus is further for performing the following operations after transmitting a video stream to a corresponding node:

notifying, at the MAC layer, the application layer of failure information corresponding to that video stream when it is detected that no acknowledgement message is received from that node;

determining, at the application layer, whether the failure packet is an I-frame according to the failure information from the MAC layer, and if the failure packet is an I-frame, transmitting the failed I-frame from the first additional queue to the MAC layer according to the index and weight of the video queue corresponding to the video stream to which the failed I-frame belongs and in connection with the weight of the first additional queue, otherwise, storing the failure packet to the second additional queue and transmitting the failure packet from the second additional queue to the MAC layer according to the weight of the second additional queue.

32. The second apparatus according to clause 30, wherein, the weight of the first additional queue corresponds to the highest priority, and the weight of the second additional queue corresponds to the next highest priority.

33. An access point in a WiFi mesh network, wherein, the access point includes the first apparatus according to any of clauses 17 to 24.

34. An access point in a WiFi mesh network, wherein, the access point includes the second apparatus according to any of clauses 25 to 32.

35. An access point in a WiFi mesh network, wherein, the access point includes:

a memory for storing one or more programs;

one or more processors connected with the memory, when executed by the one or more processors, the one or more programs cause the one or more processors to perform the following operations:

receiving a video stream and determining the node(s) to which the video stream needs to be transmitted, wherein the video stream includes a multicast address;

determining dynamically a transmission mode of the video stream and transmitting corresponding video stream to multiple stations using the transmission mode when the nodes are the multiple stations corresponding to the multicast address;

transmitting corresponding video stream to a next access point using unicast mode when the node is the next access point.

36. An access point in a WiFi mesh network, wherein, the access point includes:

a memory for storing one or more programs;

one or more processors connected with the memory, when executed by the one or more processors, the one or more programs cause the one or more processors to perform the following operations:

creating, for the multiple video streams that are received, multiple video queues at the application layer, wherein each video queue contains one of the multiple video streams;

determining, for each video queue, the weight of the video queue according to link related information corresponding to the video stream contained in the video queue;

transmitting the multiple video streams from the application layer to the MAC layer according to the weight corresponding to each video queue, in order to transmit the multiple video streams to the corresponding node.

37. A computer readable storage medium storing a computer program, which when executed by a processor, cause the processor to perform the following operations:

receiving a video stream and determining the node(s) to which the video stream needs to be transmitted, wherein the video stream includes a multicast address;

determining dynamically a transmission mode of the video stream and transmitting corresponding video stream to multiple stations using the transmission mode when the nodes are the multiple stations corresponding to the multicast address;

transmitting corresponding video stream to a next access point using unicast mode when the node is the next access point.

38. A computer readable storage medium storing a computer program, which when executed by a processor, cause the processor to perform the following operations:

creating, for the multiple video streams that are received, multiple video queues at the application layer, wherein each video queue contains one of the multiple video streams;

determining, for each video queue, the weight of the video queue according to link related information corresponding to the video stream contained in the video queue;

transmitting the multiple video streams from the application layer to the MAC layer according to the weight corresponding to each video queue, in order to transmit the multiple video streams to the corresponding node.

39. A computer program product, which when executed by a device, cause the device to perform the following operations:

receiving a video stream and determining the node(s) to which the video stream needs to be transmitted, wherein the video stream includes a multicast address;

determining dynamically a transmission mode of the video stream and transmitting corresponding video stream to multiple stations using the transmission mode when the nodes are the multiple stations corresponding to the multicast address;

transmitting corresponding video stream to a next access point using unicast mode when the node is the next access point.

40. A computer program product, which when executed by a device, cause the device to perform the following operations:

creating, for the multiple video streams that are received, multiple video queues at the application layer, wherein each video queue contains one of the multiple video streams;

determining, for each video queue, the weight of the video queue according to link related information corresponding to the video stream contained in the video queue;

transmitting the multiple video streams from the application layer to the MAC layer according to the weight corresponding to each video queue, in order to transmit the multiple video streams to the corresponding node.

The invention claimed is:

1. A method for transmitting multiple video streams in an access point in a WiFi mesh network, wherein, the method includes:
   creating, for the multiple video streams that are received, multiple video queues at an application layer, wherein each video queue contains one of the multiple video streams;
   collecting physical link metrics and generating QoS measurement information at a MAC (media access control) layer;
   transmitting the QoS measurement information from the MAC layer to the application layer;
   calculating, at the application layer, the link speed corresponding to each video queue according to the QoS measurement information from the MAC layer;
   determining, for each video queue, the weight of the video queue according to link related information corresponding to the video stream contained in the video queue, wherein the determining the weight of the video queue includes calculating, for each video queue, a queue metric corresponding to the video queue according to ingress rate and the link speed corresponding to the video queue and determining the weight of the video queue according to the queue metric corresponding to the video queue; and,
   transmitting the multiple video streams from the application layer to the MAC layer according to the weight corresponding to each video queue, in order to transmit the multiple video streams to the corresponding node.

2. The method according to claim 1, wherein, said creating, for the multiple video streams that are received, multiple video queues at the application layer, further includes performing the following operation while creating multiple video queues at the application layer:
   creating a first additional queue for storing I-frame (intra-prediction frame) packets and a second additional queue for storing other failure packets at the application layer;
   wherein, the method further includes:
   copying, at the application layer whenever a new I-frame is transmitted to the MAC layer, the I-frame to the first additional queue in parallel, and recording the index and weight of the video queue corresponding to the video stream to which the I-frame belongs.

3. The method according to claim 2, wherein, the method further includes the following operations performed after transmitting a video stream to a corresponding node:
   notifying, at the MAC layer, the application layer of failure information corresponding to that video stream when it is detected that no acknowledgement message is received from that node;
   determining, at the application layer, whether the failure packet is an I-frame according to the failure information from the MAC layer, and if the failure packet is an I-frame, transmitting the failed I-frame from the first additional queue to the MAC layer according to the index and weight of the video queue corresponding to the video stream to which the failed I-frame belongs and in connection with the weight of the first additional queue, otherwise, storing the failure packet to the second additional queue and transmitting the failure packet from the second additional queue to the MAC layer according to the weight of the second additional queue.

4. An apparatus for transmitting video streams in an access point in a WiFi mesh network, wherein, the apparatus comprises:
   at least one memory for storing one or more programs; and,
   one or more processors connected with the memory,
   wherein, when executed by the one or more processors, the one or more programs cause the apparatus to-
   create, for multiple video streams that are received, multiple video queues at an application layer, wherein each video queue contains one of the multiple video streams,
   collect physical link metrics and generating QoS measurement information at a MAC (media access control) layer,
   transmit the QoS measurement information from the MAC layer to the application layer,
   calculate, at the application layer, the link speed corresponding to each video queue according to the QoS measurement information from the MAC layer,
   determine, for each video queue, the weight of the video queue according to link related information corresponding to the video stream contained in the video queue by calculating, for each video queue, a queue metric corresponding to the video queue according to ingress rate and the link speed corresponding to the video queue and determining the weight of the video queue according to the queue metric corresponding to the video queue, and,
   transmit the multiple video streams from the application layer to the MAC layer according to the weight corresponding to each video queue, in order to transmit the multiple video streams to the corresponding node.

5. The apparatus according to claim 4, wherein, when executed by the one or more processors, the one or more programs cause the apparatus to create, for the multiple video streams that are received, multiple video queues at the application layer including further performing the following operation while creating multiple video queues at the application layer:

creating a first additional queue for storing I-frame (intra-prediction frame) packets and a second additional queue for storing other failure packets at the application layer;

and wherein, when executed by the one or more processors, the one or more programs cause the apparatus to:

copy, at the application layer whenever a new I-frame is transmitted to the MAC layer, the I-frame to the first additional queue in parallel, and record the index and weight of the video queue corresponding to the video stream to which the I-frame belongs.

6. The apparatus according to claim 5, wherein, when executed by the one or more processors, the one or more programs cause the apparatus to further perform the following operations after transmitting a video stream to a corresponding node:

notifying, at the MAC layer, the application layer of failure information corresponding to that video stream when it is detected that no acknowledgement message is received from that node; and, determining, at the application layer, whether the failure packet is an I-frame according to the failure information from the MAC layer, and if the failure packet is an I-frame, transmitting the failed I-frame from the first additional queue to the MAC layer according to the index and weight of the video queue corresponding to the video stream to which the failed I-frame belongs and in connection with the weight of the first additional queue, otherwise, storing the failure packet to the second additional queue and transmitting the failure packet from the second additional queue to the MAC layer according to the weight of the second additional queue.

7. An access point in a WiFi mesh network, wherein, the access point includes the apparatus according to claim 4.

8. A computer readable storage medium storing a computer program, which when executed by a processor, cause the processor to perform the method according to claim 1.

* * * * *